United States Patent [19]

Hedenberg

[11] Patent Number: 4,590,850

[45] Date of Patent: May 27, 1986

[54] APPARATUS FOR AUTOMATICALLY MAKING OF FOOD PRODUCTS SUCH AS BREAD, CAKES AND THE LIKE

[75] Inventor: Gunnar Hedenberg, Grundsund, Sweden

[73] Assignee: Heden Team A.G., Triesenberg, Liechtenstein

[21] Appl. No.: 688,983

[22] Filed: Jan. 4, 1985

Related U.S. Application Data

[63] Continuation-in-part of Ser. No. 565,398, Dec. 27, 1983, Pat. No. 4,550,654, which is a continuation-in-part of Ser. No. 481,154, Apr. 1, 1983, Pat. No. 4,550,653.

[51] Int. Cl.⁴ .................. A47J 27/62; A47J 37/01
[52] U.S. Cl. ........................................ 99/348; 99/353; 99/467; 99/483
[58] Field of Search ............... 99/483, 485, 348, 353, 99/359, 357, 467; 426/233, 392; 366/149, 146, 219, 69, 240, 349, 348, 341, 69, 602; 206/219

[56] References Cited

U.S. PATENT DOCUMENTS

| | | |
|---|---|---|
| 2,800,269 | 7/1957 | Smith . |
| 3,194,185 | 7/1965 | Spinosa . |
| 3,282,412 | 11/1966 | Corella et al. . |
| 3,582,363 | 6/1971 | Jones . |
| 3,588,054 | 6/1971 | Ljungberg et al. . |
| 3,819,158 | 6/1974 | Sharpe et al. ................. 366/349 |
| 3,873,735 | 3/1975 | Challin et al. . |
| 4,189,992 | 2/1980 | Barry . |
| 4,234,605 | 11/1980 | Takeuchi ................. 99/348 X |
| 4,241,648 | 12/1980 | Longenecker . |
| 4,304,177 | 12/1981 | Loeffler et al. ............. 99/348 X |
| 4,882,768 | 5/1975 | Troisi et al. . |

FOREIGN PATENT DOCUMENTS

| | | |
|---|---|---|
| 2819752 | 4/1979 | Fed. Rep. of Germany . |
| 3115999 | 5/1982 | Fed. Rep. of Germany . |
| 2389947 | 12/1978 | France . |
| 1402538 | 8/1975 | United Kingdom . |
| 2049604 | 12/1980 | United Kingdom . |

Primary Examiner—Timothy F. Simone
Attorney, Agent, or Firm—Holman & Stern

[57] ABSTRACT

An apparatus for automatically making food products in piece form from dough-like substances without soiling vesels and utensils and which can be programed so that the apparatus will make the food product in the fresh prepared state at the desired time. The apparatus coprises a dough preparation station containing holding means adapted to be affixed to the opening of a flexible, sealable bag, which contains the necessary ingredients for the dough-like substance. The kneading means operates by passing the bag through slit openings above and below the dough preparation station and the slit openings are each defined by two rollers. One of the rollers in the upper pair of rollers is moveable relative to the other roller so as to allow gas to escape. The bag is moved up and down through the slit openings to knead the ingredients into a dough-like substance. The apparatus further comprises a heat treatment station containing heating means whereby the kneaded dough-like substance is baked.

8 Claims, 17 Drawing Figures

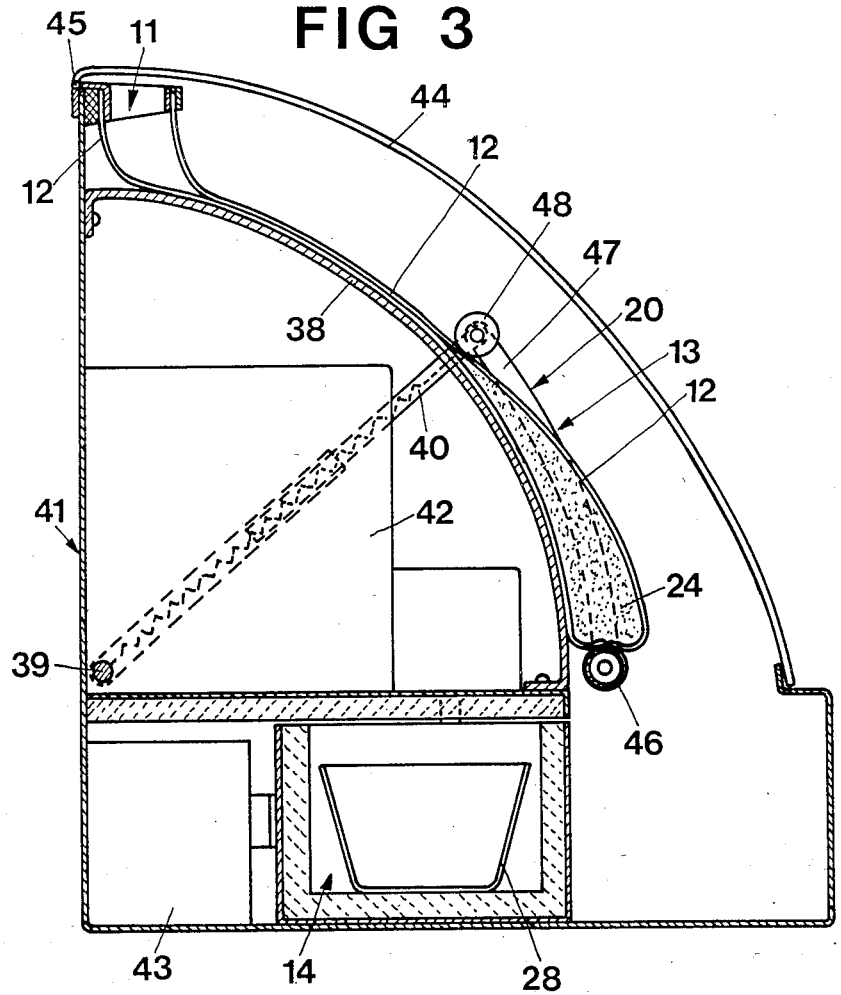
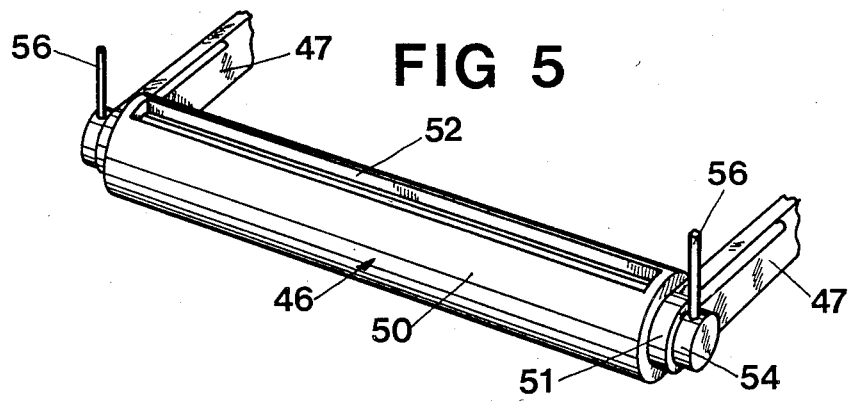

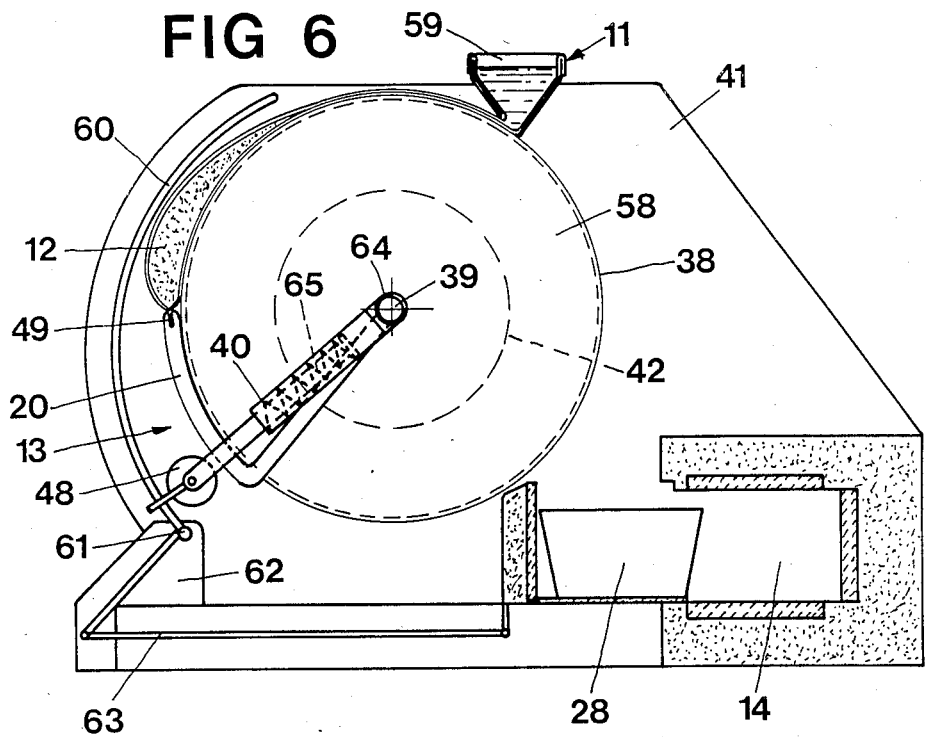
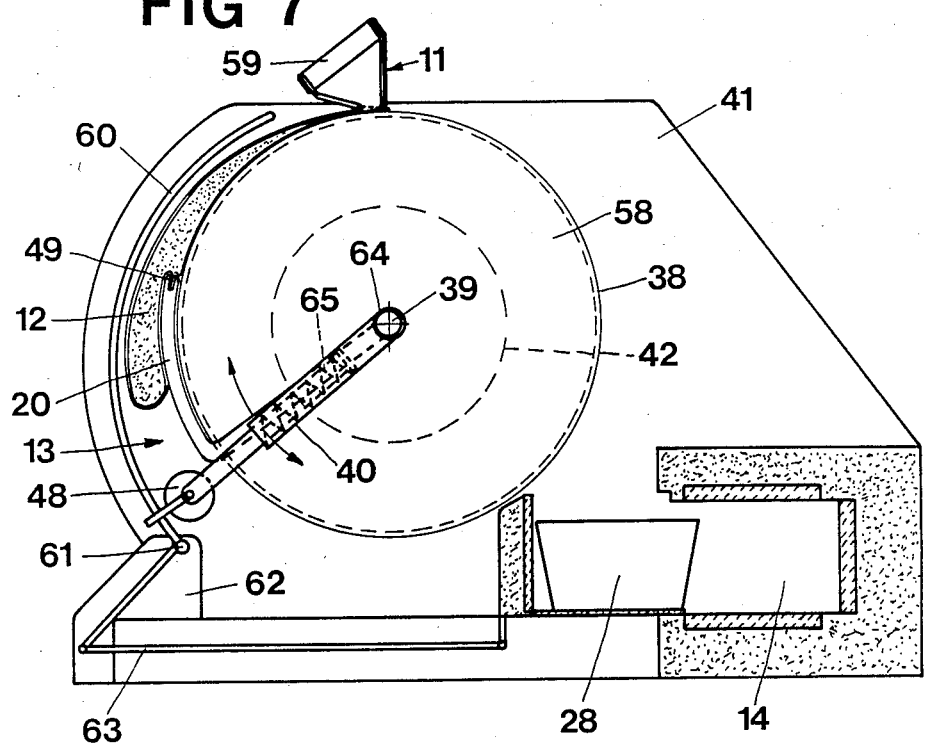

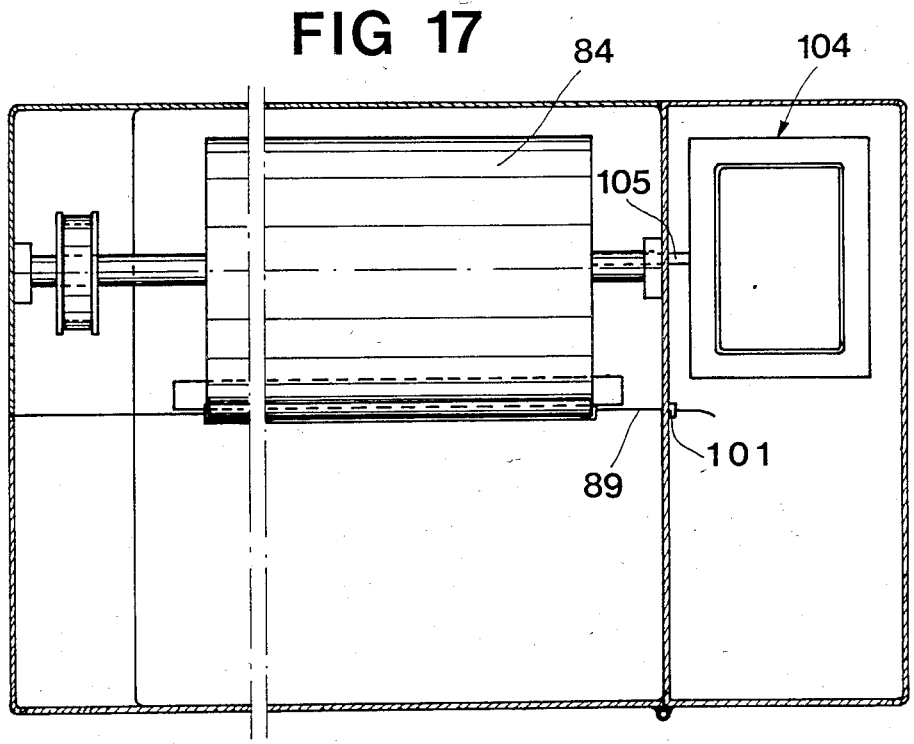

APPARATUS FOR AUTOMATICALLY MAKING OF FOOD PRODUCTS SUCH AS BREAD, CAKES AND THE LIKE

This application is a continuation-in-part of U.S. patent application Ser. No. 06/565,398, filed Dec. 27, 1983, now U.S. Pat. No. 4,550,654, which in turn is a continuation-in-part of U.S. patent application Ser. No. 06/481,154, filed Apr. 1, 1983, now U.S. Pat. No. 4,550,653.

TECHNICAL FIELD

The present invention concerns an apparatus for automatic making food products in piece form from dough-like substances comprising a mixing and dough preparation station and a heat treatment station containing heating means whereby the dough-like substance is treated, the operation of the afore-mentioned elements being all predetermined with program means so that the apparatus will make the food product and such product will be in the fresh prepared state at the desired time.

BACKGROUND OF THE INVENTION

Baking bread for household purposes is a relatively complicated, time consuming, work intensive and messy business. Remembering that the quality of the bread to a certain extent depends on the fermentation time and that the fermentation procedure should be performed under correct conditions which takes a relatively long time, there are few people that have the privilege of eating fresh home-made bread for breakfast.

Through U.S. Pat. No. 3,194,185 there is previously known a method of manually mixing and kneading the ingredients to a pizza dough in a flat, flexible bag. This is designed so that the dough, which is rolled out in the bag, has the circular shape of the bag. Further the bag is designed so that one of its sides can be torn away, so that the rolled-out dough easily can be placed on a baking-plate. This method suggests a solution of the problem of the messy procedure of mixing and kneading the dough, but it does not give any advice of how it would be possible to automatically produce e.g. bread.

Through U.S. Pat. No. 4,234,605 there is known a bread baking apparatus, in which one and the same vessel is used for mixing the ingredients and kneading the dough. Further the fermentation as well as the baking of the dough takes place in this vessel which is a dough preparation and baking vessel.

This baking apparatus in fact is only suited for relatively liquid doughs. Since neither the vessel, the dough preparation utensils nor the lid of the vessel will be cleaned between the dough kneading procedure and the baking, the dough adhered to these utensils will be burned and stuck during the baking procedure. This can influence the taste of the baked product and make the cleaning considerably more difficult. The baking apparatus also requires relatively complicated equipment with special driving means for raising and lowering the vessel to and from the kneading and mixing positions.

SUMMARY AND ADVANTAGES OF THE INVENTION

The object of the invention is to provide a baking apparatus which can produce food products such as bread, without any real manual work involved, without soiling various vessels and utensils, and which apparatus can be programmed so that a correctly performed fermentation process under the correct temperature is achieved so that a qualitatively excellent product is obtained.

Another object of the invention is to provide a baking apparatus the construction of which is simple and therefore relatively inexpensive to manufacture. It should also be compact, it should not require any more space than a coffee percolator, as it should be placed on a counter in the kitchen. A further desire is to bake food products of various kinds, i.e. different kinds of bread, cakes, pies and the like.

This is achieved by the fact that the mixing and dough preparation station comprises: holding means adapted to be affixed to the opening of a flexible, sealable bag containing the necessary dry indgredients for the dough-like substance; liquid means for introducing a predetermined amount of liguid into the dry ingredients; and kneading means for mechanically working the liquid and dry ingredients in said bag by external mechanical agitation thereof.

BRIEF DESCRIPTION OF THE DRAWINGS

FIG. 3 shows a section through a second embodiment of the baking apparatus according to the invention with a separate dough preparation and heat treatment station.

FIG. 5 shows the roller according to FIG. 4 in perspective.

FIGS. 6-8 show sections through a third embodiment of a modified baking apparatus.

FIG. 13 shows a section through a seventh embodiment of a baking apparatus for making round loafs, pizzas or the like.

FIG. 17 is a section according to the line XVII—XVII in FIG. 16.

DESCRIPTION OF PREFERRED EMBODIMENTS

Figure 1:
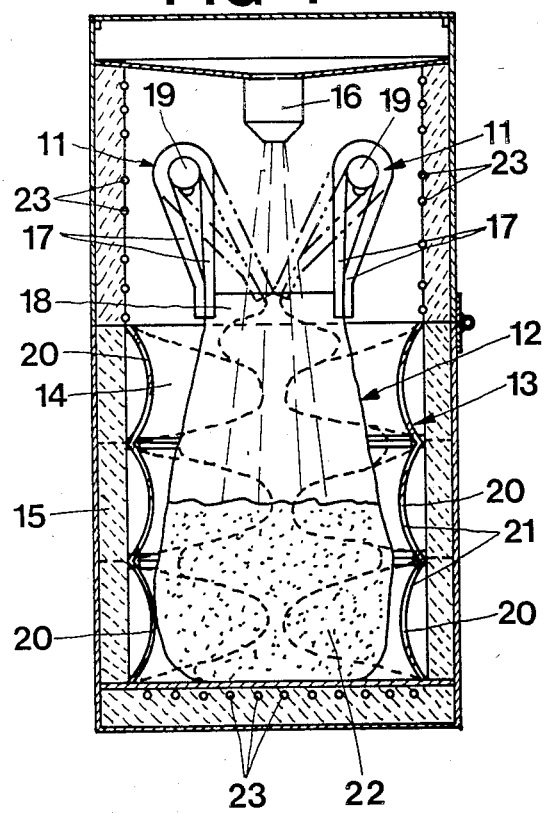
FIG. 1 shows schematically a section through a baking apparatus according to the invention with hydraulic or pneumatic dough preparation.
Figure 2:
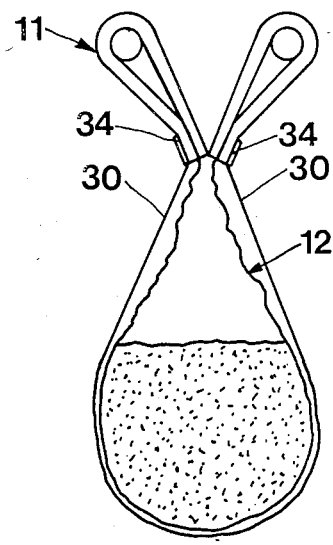
FIG. 2 shows a section through a second embodiment of a holding means with double vessels.

FIGS. 1 and 2

The apparatus according to the embodiment shown in FIG. 1 consists of holding means 11, a flexible bag 12 attachable thereto and a common dough preparation and heat treatment station 13, 14. The whole arrangement is located inside a thermally insulated casing 15.

The flexible bag 12, which e.g. can be a bag of heat resistant material, can be used as a transportation package for the dry ingredients from the producer to the user and as a vessel during the preparation of the dough and possibly also during the baking. The bag 12 must therefore withstand rough mechanical treatment and possibly also contains a second bag-or the like, in which is contained the liquid required for preparation of the dough. Alternatively, the liquid for the dough can also be added through a nozzle 16, especially if the liquid is only water. The bag 12 is attached to least two holding means 11 which are so formed that the end pieces of the opening 18 of the bag can be squeezed between gripping means 17. After attaching the bag 12 to the holding means 11 the baking apparatus is programmed by, for example, a punched card which is sensed by the programmer which then takes care of the whole production process. The punched card could possibly be supplied with the dry ingredients, attached to the package, or alternatively be part of a program library belonging to the baking apparatus.

The holding means 11 are rotatable aout their own axles 19 so that the bag can either be held open, as shown in FIG. 1 with continuous lines, or also be closed as shown with dash-dotted lines.

In the case where the bag contains an inner bag containing liquid for the dough, it could be sufficient that the dough preparation station has only one holding means 11 as the entire dough preparation procedure can take place in the unopened bag.

The dough preparation station 13 is placed directly under the holding means 11 and can be made in a number of different embodiments. In the embodiment shown in FIG. 1 the dough preparation station consists of a hydraulically or pneumatically driven device, spaced from the bag 12 and provided with a number of kneading means 20 around the bag. Each kneading means consists of a flexible wall 21, which by increasing the pressure of the working medium, can expand and upon reducing the pressure return to the original contracted position. Through individual regulation of the different kneading means 20 a systematic and effective mixing together of the ingredients and the desired kneading of the dough is achieved.

If the liquid for the dough is in a bag in an inner vessel or in a compartment provided by, e.g. a weld joint, the kneading means 20 directly opposite the inner bag can be activated before the other kneading means are started, so that the inner vessel is burst, possibly along a breaking line, and the baking liquid is added to the dry ingredients 22.

The programmer interrupts the dough preparation after an empirically pre-determined dough preparation time so that no overworking of the dough occurs which could lead to dry bread. Already during the preparation of the dough the heater 23 in the heat treatment station 14 can be started in order to obtain an appropriate fermentation temperature. The dough can be made to ferment several times possibly interrupted by new kneading operations according to the inserted program. When the fermentation of the dough is finished the baking takes place directly in the combined dough preparation and baking station 13,14. It is possible to have spray nozzles (not shown) for spraying the dough or the finished baked product with water or another appropriate liquid for creating a crust and/or a glossy surface on the bread.

Due to the fact that the flexible bag 12 must be made of thick plastic which can withstand the kneading of its contents, it will be relatively expensive. According to an alternative embodiment shown in FIG. 2, an outer flexible container 30 is attachable to the holding means 11, inside which container the bag 12 can be placed, which contains the ingredients which are needed for making the desired food product. The bag, can in this embodiment consist of very thin plastic foil since the real mechanical work is done on the outer flexible container 30.

FIGS. 3-5

Figure 4:
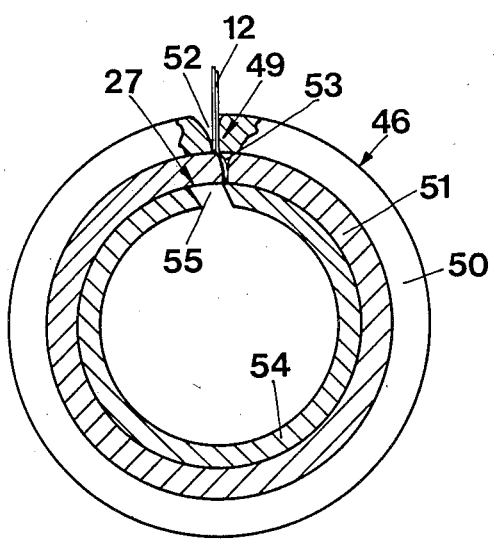
FIG. 4 shows on a larger scale a section through a roller which is part the apparatus according to FIG. 3.

The dough preparation station of the baking apparatus can as was already mentioned, be designed in many ways, and a second variant is shown in FIGS. 3-5. In this embodiment the ingredients in the bag 12 and the dough 24 are worked along a path, which principally has the same function as a rolling board. The path or the rolling board 38 is curved and forms a part of a circular arc in the center of which a pivot axle 39 is arranged, which transfers its movement to two arms 40. The rolling board 38 is fixedly attached in a housing 41 comprising the dough preparation station 13 with the driving means 42 for the arms 40 and a heat treatment station 14 or baking oven with a driving means 43 for linear movement of the baking oven 14 from a pushed-in to a drawn-out position. The housing 41 is further provided with a lid 44 pivoted about a hinge 45. A holding means 11 for carrying the upper opening of the bag 12 is also pivoted about said hinge.

The dough preparation station 13 consists of the above mentioned arms 40 placed on each side of the part-cylindrical rolling board 38. To the upper end of the arms 40 are attached kneading means 20 consisting of a roller 46 arranged at the free end of a pair of links 47 which are rotatably attached to a pressing roll 48 which is freely rotatably mounted at the free ends of the arms 40.

The upper end of the rolling board 38 is formed with a somewhat larger radius than the rest of the rolling board so that a harder pressure by the pressing roll 48 against the rolling board 38 is obtained in that area. The arms are preferably in the form of telescoping arms in which is arranged a tension spring exerting a predetermined pressure on the pressing roll 48 against the rolling board 38.

The roller 46 is apropriately made with fixation pieces 49 through which the lower end of the bag 12 can be affixed to the roller. In the embodiment of FIGS. 4 and 5 the roller 46 consists of an outer casing, for example of a somewhat elastic material, such as synthetic rubber, and an inner cylinder 51, which is rotably mounted at the free ends of the links 47. Both the outer casing 50 and the inner cylinder 51 are equipped with its own slit 52, 53 in which the lower end of the bag can be inserted and fixed by moving the outer casing 50 relative to the cylinder 51. The lower end part of the bag inserted in the slit may already be slitted and held closed by the fixation pieces 49, but it is also possible to equip the roller 46 with a cutting device 27 in the form of a slitted bushing 54 inside the inner cylinder, the slit being placed opposite the slits 53 and 52 so that the extreme end of the bag can be inserted in the slit 55. The bushing 54 is longer than the inner cylinder 51 and actuating members 56 are attached to the portions outside the inner cylinder 51 which in a certain position of the roller 46 cooperates with fixed abutments (not shown)

so that the bushing is turned in relation to the cylinder whereby the end of the bag inserted in the slit 55 is cut off.

The bag 12 can contain the baking liquid, in a separate bag which separate bag through the action of the dough preparation station is opened so that its content is emptied into the bag, or also it is also possible to add the liquid manually as will be described below.

In accordance with what is shown in FIG. 3, the upper end of the bag is fixed in the holding means 11 of the baking apparatus, which holds the bag open so that an opening is formed. In that position the kneading means 20 of the dough preparation station are placed in their initial position in which the bag can be drawn under the pressing roll 48 while the lower end of the bag can simultaneously be fixed to the roller 46.

When the bag is in place the arms 40 are moved to their upper position in which the roller 48 exerts a pressure so great against the bag and rolling board 38 that an effective sealing is achieved. Then the liquid for the dough can be poured into the funnel-shaped upper part of the bag 12 and the timer in the baking apparatus prorammer is set to the desired initiation time.

At an appropriate time the arms 40 are activated and moved downwards so that the liquid can run down and after a number of up and down movements about the axle 39 the dry ingredients have been mixed with the baking liquid to form a doughy mass. Depending the baking recipe the kneading is repeated an appropriate number of times interrupted by fermentation periods. When the dough is completely worked and fermented the programmer starts the drive mechanism which moves the baking oven 14 to the position in which the baking tin 28 is positioned under the lower end of the bag 12.

In order to open the bag the arms 40 execute a much larger arcuate motion in comparison to the kneading motion, whereby the lower part of the bag is cut off and released from the roller 46 while the ressing roll 48 presses the dough mass out of the lower opening of the bag and into the baking tin 28 during the rollers downward motion. The baking oven 14 is then drawn back to its original position where the actual baking takes place.

FIGS. 6-8

Figure 8:
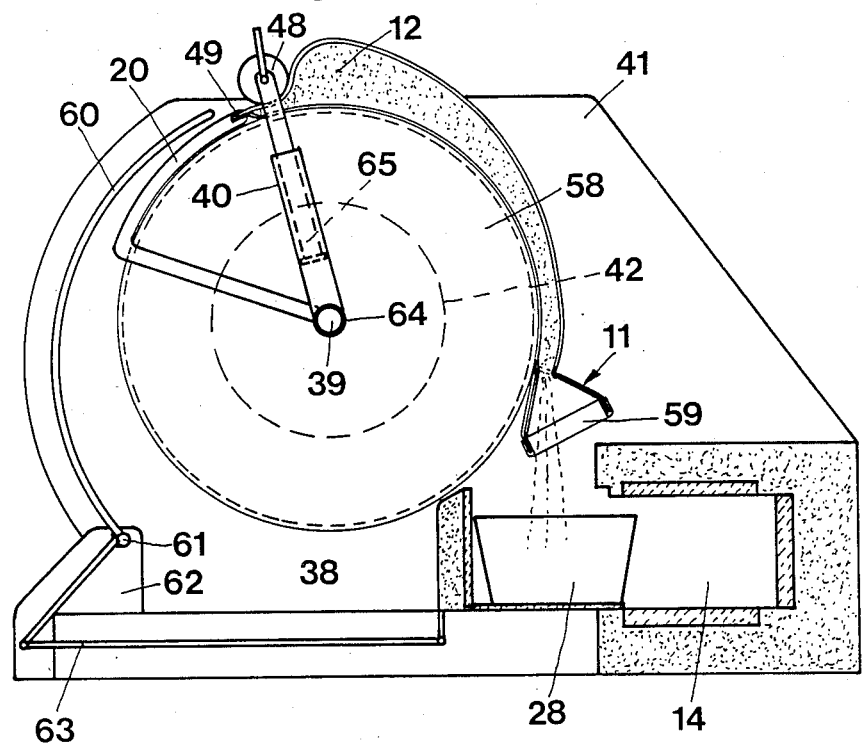

In the embodiment according to FIGS. 6-8 the curved path i.e. the baking board 38 consists of a cylinder with a circular cross section and rotatably mounted in the baking oven housing 41. In the same way as in the previous embodiments this is equipped with a kneading means 20 rotatable from the center of a drum 58, which kneading means is equipped with fixation means 49 at its free end for holding the lower end of the bag 12. The upper end of the bag is connected to a holding means 11 in such a way that a funnel-shaped opening is formed, whereby the attachment can be performed by drawing the folded edges of the bag around the opening over a frame 59 fastened to the holding means 11.

A pressing roll 48 is also rotatably affixed at the center of the drum 58 and is spring biased and supported by two arms 40 whereby the springs draw the pressing roll 48 radially inwardly towards the envelope surface of the drum 58. The pressing roll 48 is further guided by guide means 60 which is curved along the curve of the drum and which is rotatable about a hinge 61 by a drive mechanism 62. The guide means 60 can also be formed by the front cover of the baking apparatus. It is possible that a rod means 63 can come from the drive mechanism 62 which together with manouvering the cover 60 moves the baking tin 28 from a position outside the heat treatment station 14 to a position within.

In the initial position (FIG. 6) the holding means 11 is placed on one side, the right side, of the highest point of the drum 58. In that position the bag with the dry ingredients is attached to the holding means 11, at which the upper part of the bag forms a funnel-like opening. Into this opening is poured the required amount of liquid to form the dough and then the baking apparatus timer is adjusted to the desired start time. In a programmer, not shown, a program card is inserted or a desired program is started. After the alloted time the drum 58 is turned slowly counter clockwise until the funnel-shaped opening is located at the highest point of the drum 58 and the liquid can flow over to that part of the bag where the dry ingredients are located (FIG. 2). During rotation of the drum in counter clockwise direction the kneading means 20, which is fixed to the lower end of the bag, will move. When essentially all of the liquid has been emptied into the bag the kneading means 20 is activated and carries out a to and fro motion about the central drive axle 39 of the drum by means of a drive mechanism 42 placed in the drum.

It is possible that the kneading can be augmented by the pressing roll 48 which independently of the kneading means 20 is rotatable about a pipe axle 64 about the rotation axle 39. By means of the guide 60 the pressing roll 48 can be held at an appropriate distance from the rolling board 38 of the drum 58 by means of a spring 65 so that an appropriate redistribution of the dough mass in the bag 12 is achieved. Working the dough through the kneading piece 20 is shown in FIG. 7.

The guide 60 acting as a cover can be adjusted for light pressure on the bag during the fermentation periods whereby an effective distribution of the heat from the fermentation process is achieved. The cover is appropriately made of a heat conductive material, for example aluminum. During the fermentation itself the cover can only weakly contact the bag and must give way when the dough expands. When the dough preparation is finished the drum 58 is rotated clockwise enough that the funnel-shaped opening with the holding means 11 is located above the baking tin 28, as shown in FIG. 8. The kneading means 20 is also moved so that the bag 12 is turned upside down. In this position the pressing roll 48 is activated, which has left the guide 60 and is biased by the spring 65 in the direction towards the rolling board 38 of the drum 58. The pressing roll 48 is moved over the whole length of the bag up to the funnel-shaped holding means 11 pressing the dough out of the bag opening and into the baking tin 28. Finally the drive mechanism 62 moves the baking tin 28 into the heat treatment station 14 where it is possible for a final fermentation to take place and the baking is carried out. When the baking procedure is concluded it is possible that the baking tin 28 is again taken out of the baking oven so that the bread can cool outside the oven.

Depending on what kind of food product is to be produced in the baking apparatus the heat treatment station is adjusted also in accordance with those requirements. If the dough for example is to be boiled in water or fried in oil the baking tin is exchanged for appropriate cooking vessel.

FIG. 9

Figure 9:
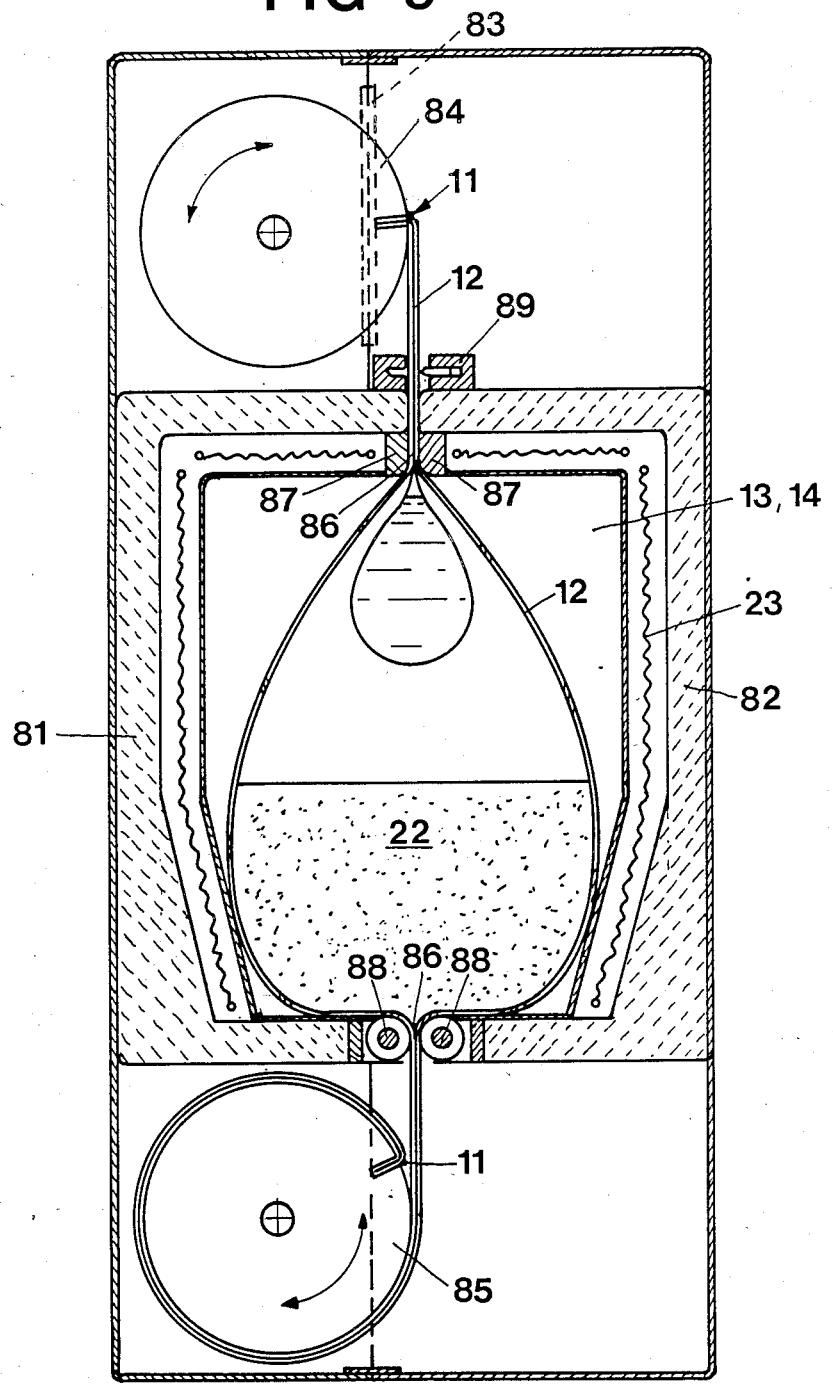
FIG. 9 is a section through a baking apparatus according to a fourth embodiment where the dough preparation takes place in cooperation with the baking oven.

The embodiment shown in FIG. 9 comprises a common dough preparation and heat treatment station 13,14 consisting of two housing halves 81,82 of which the first one 81 is stationary while the second one 82 is displaceable or rotatable with respect to the stationary half. In the embodiment shown the movable housing half 82 is rotatable about a vertical hinge 83 so that the dough preparation and heat treatment stations 13,14 and the holding means can be reached.

The mixing of the ingredients and the dough preparation is accomplished by attaching the upper end portion of the bag to a holding means 11 at an upper rotatable roll 84, while the lower end of the bag in a corresponding way is attached to another holding means 11 at a lower rotatable roll 85. The rolls 84 and 85 are driven by a reversible motor (not shown) about one revolution, after which the motor is reversed. In this way the bag 12 is given an oscillating up and downwards movement. The bag must pass through an upper and a lower slit-shaped opening 86 between the housing halves 81 and 82, which only permits a substantially empty bag to pass. This means that the content of the bag, the dough, alternatively will be kneaded against the upper and lower part of the inner walls of the baking oven 14, where the slits 86 are located. In order to reduce the friction between the bag and the edge between the slit and the inner wall, these parts can be provided with rounded sliding surfaces 87 or rolls 88.

Practical tests have proved that a very effective mixing and kneading of the dough is achieved by this very simple device, even if the dough is relatively stiff. If rolls 88 are used as friction-reducing means, these can be driven so that they also can serve as transport and feeding rolls.

The bags with the ingredients are preferably delivered hermetically sealed and if the baking recipe prescribes that the preparation of the dough and/or the baking should be made under atmospheric conditions it is appropriate to arrange a perforation and/or cutting device 89. The cutting device can perforate the bag in a certain position, so that the interior of the bag will communicate with the atmosphere. The device also can cut-off the bag, which may be desired during the baking procedure, especially in cases where the interior space of the baking oven also should serve as a baking tin and where it is desired that the dough should spread over the entire baking tin and not be limited by an expanded bag 12.

Figure 10:
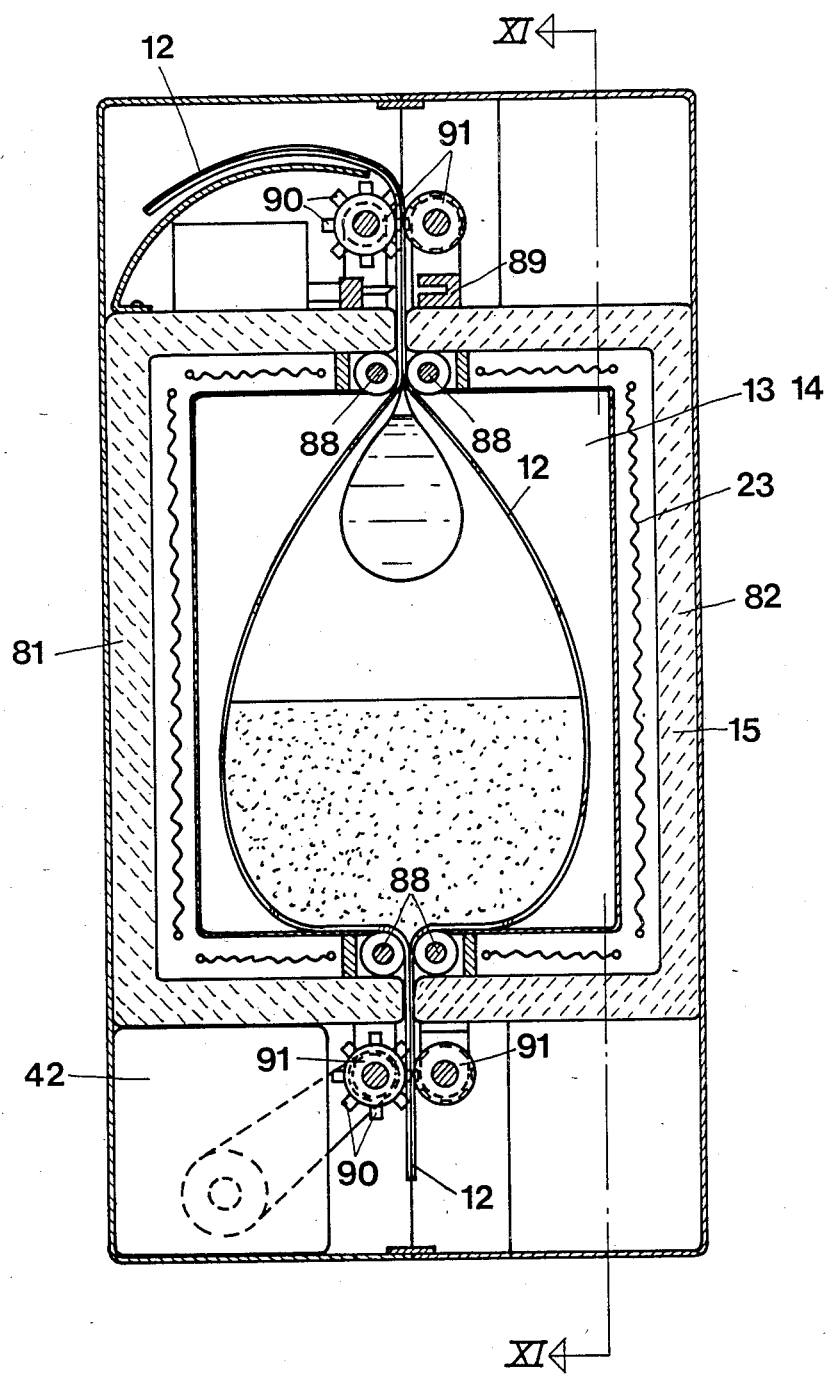
FIG. 10 shows a section through a fifth embodiment of the baking apparatus modified with respect to FIG. 9.
Figure 11:
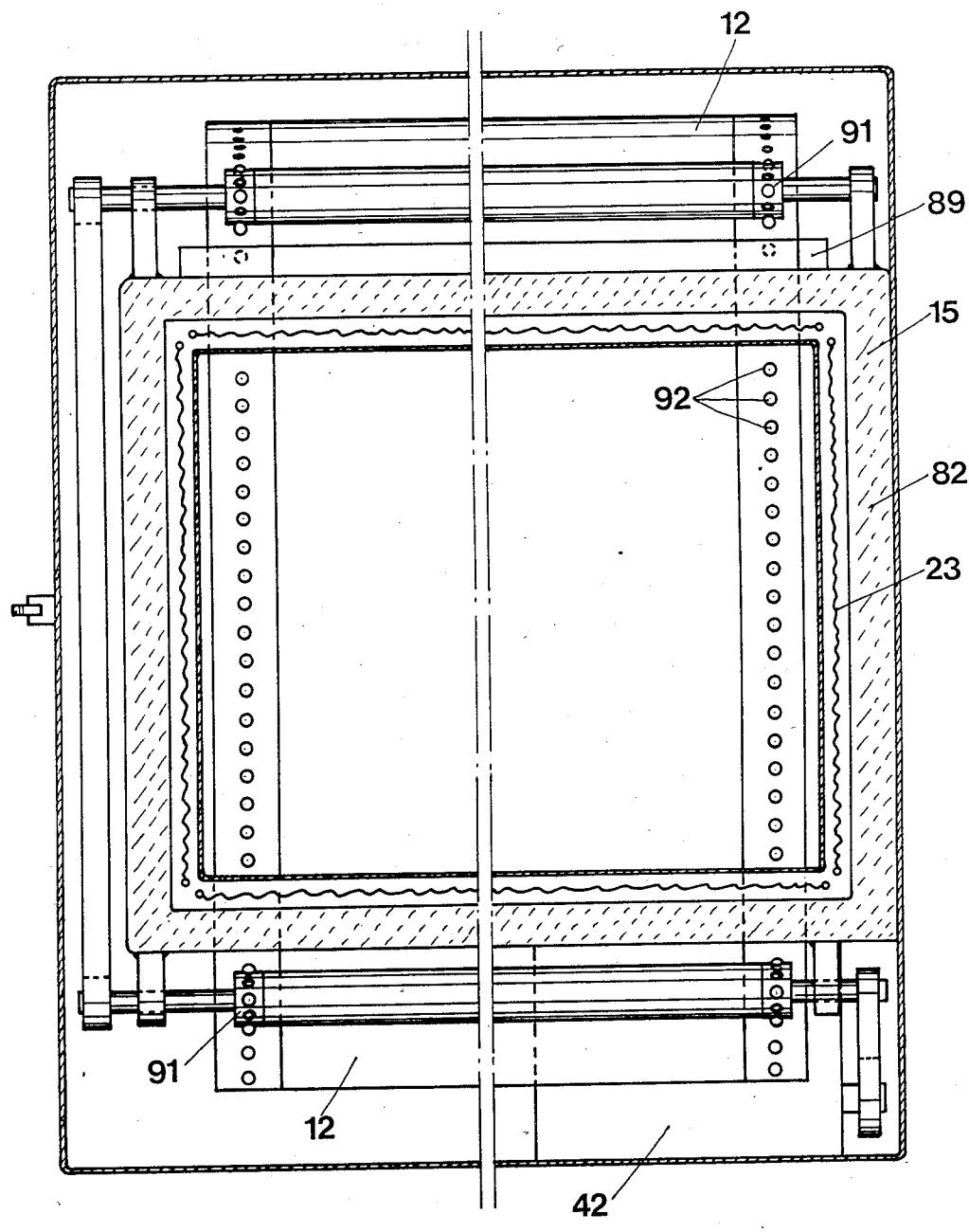
FIG. 11 shows a section according to the line XI—XI in FIG. 10.

FIGS. 10 and 11

In the embodiment according to FIG. 10 the holding means 11 consist of driven rolls 91 provided with teeth 90, which engage perforations 92 at the side edges of the bag, by which the bag 12 can be transported up and down in the same way as was described with reference to the embodiment of FIG. 9. This new embodiment however has the advantage that the construction can be made even more compact, i.e. with a lower constructional height, and that the attachment of the bag 12 to the attachment members of the combined holding- and transport device, i.e. the teeth 90, can be simplified further.

FIG. 12

Figure 12:
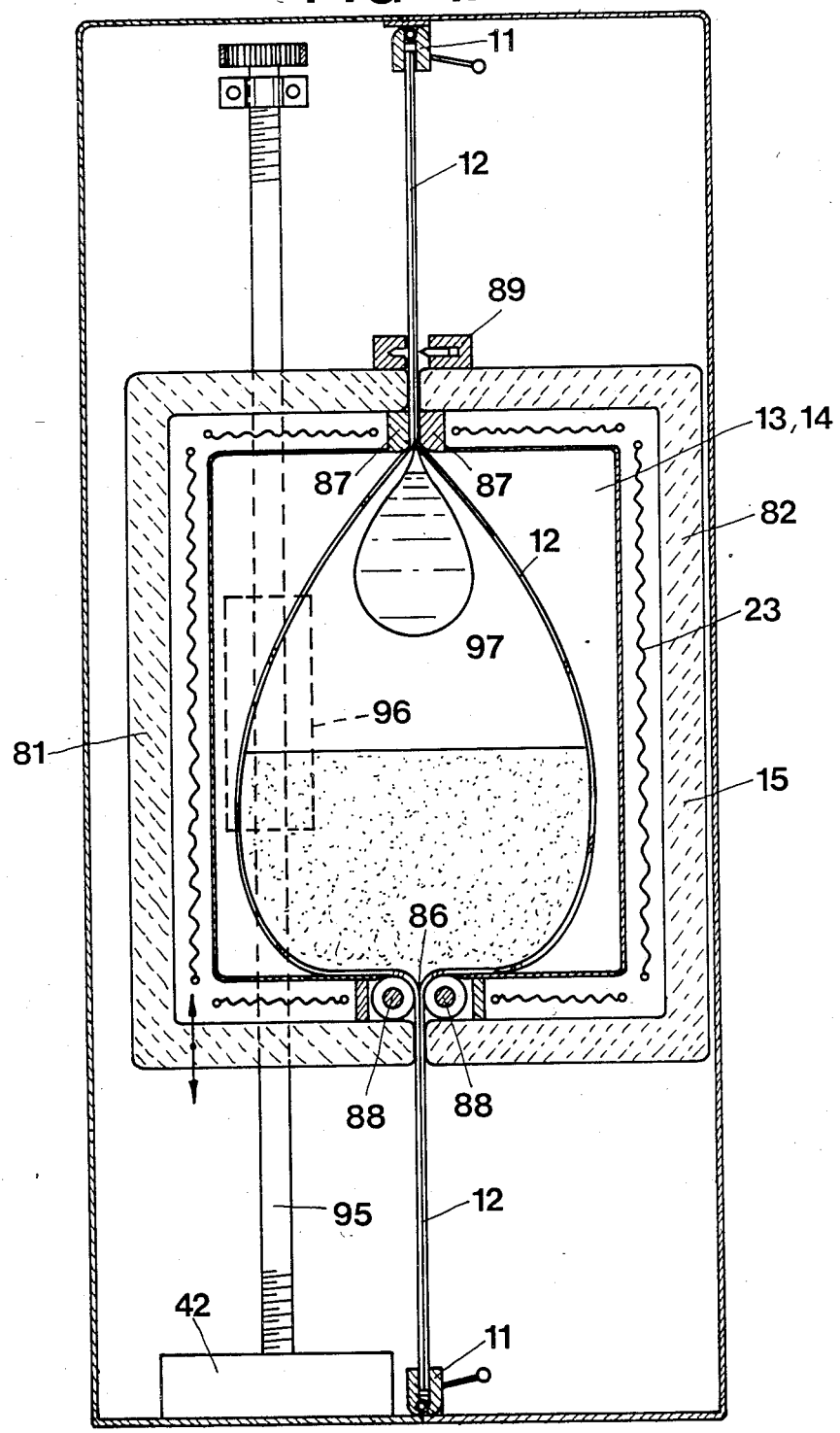
FIG. 12 shows a section through a sixth embodiment in which the baking oven is movable with respect to the fixed vessel.

Another alternative embodiment of the baking apparatus shown in FIGS. 9, 10 and 11 is shown in FIG. 12, where the bag is stationary, i.e. it is at its upper and lower ends attached to appropriate holding means 11, while the combined dough preparation and heat treatment station 13,14 in its two-piece design is movable in the longitudinal direction of the bag 12. This displaceability of the baking oven is provided by means of two spindles 95 arranged on opposite sides of the baking oven and rotatable by means of a motor 42, the spindles cooperating with nuts 96 fixedly attached to the outer casing of the baking oven. With the up- and downwards movement of the baking oven a inner bag 97 with the baking liquid will in the same way as in the embodiments according to FIGS. 9-11 and in cooperation with the slide or roll members 87 and/or 88 in the slits 86 burst the inner bag 97 so that its contents, i.e. the liquid can mix with the dry ingredients in the plastic bag 12. By giving the baking oven 14 an up- and downwards motion the dough in the bag will be kneaded to and fro, by which an effective kneading is achieved.

FIG. 13

Figure 13:
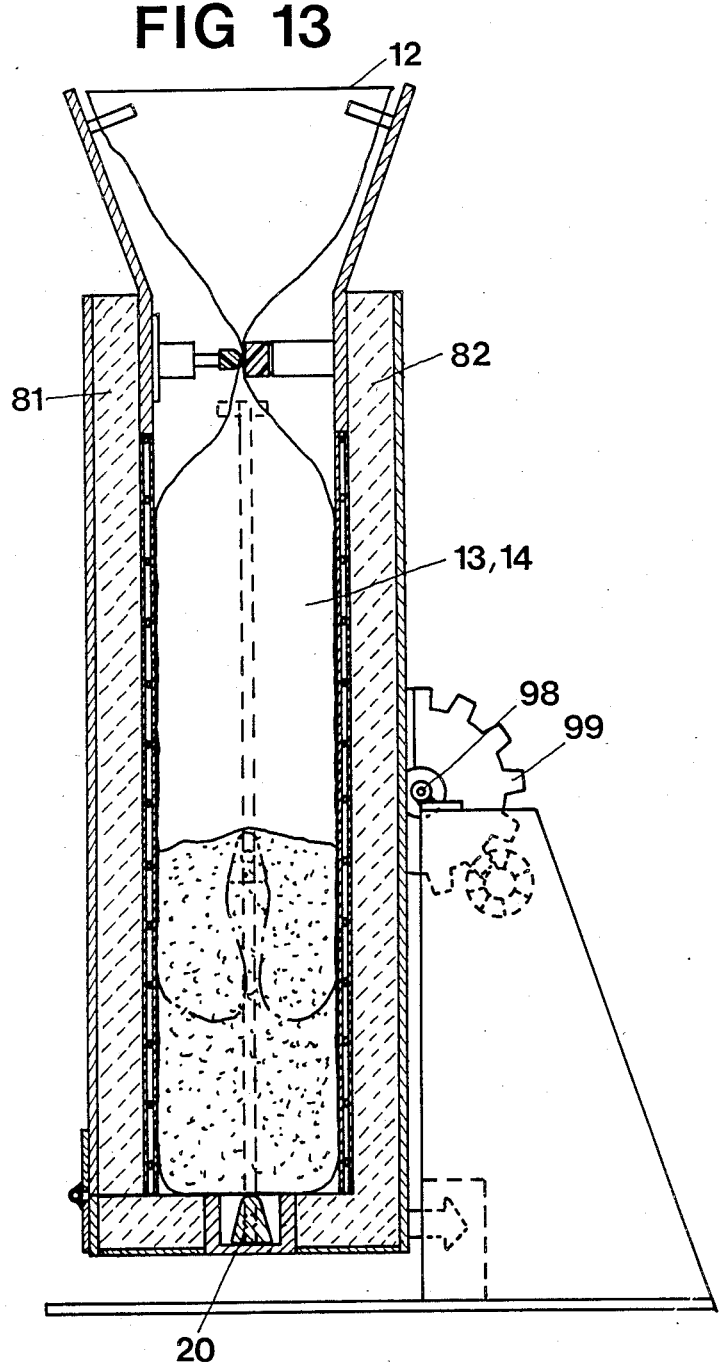

The baking of round bread loafs, pizzas and the like is also possible with the baking apparatus according to the invention. In FIG. 13 is shown a section through a baking apparatus which is constructed so that the mixing of the ingredients and the kneading of the dough is made by the combined dough kneading- and heat treatment station 13,14 located in vertical position, while the bread loaf or pizza is rolled out with the apparatus in horizontal position. For this purpose the baking oven is pivoted about a pivot 98, which by way of a gear 99 and a motor (not shown) can be turned from vertical to horizontal position and vice versa. The working of the dough is made by means of a kneading means 20 movable in the longitudinal direction of the dough kneading station 13 and which during its up- and downwards motion in the kneading station works the dough mass. In the same way as was described above the liquid can be supplied to the ingredients at an appropriate time.

Figure 14:
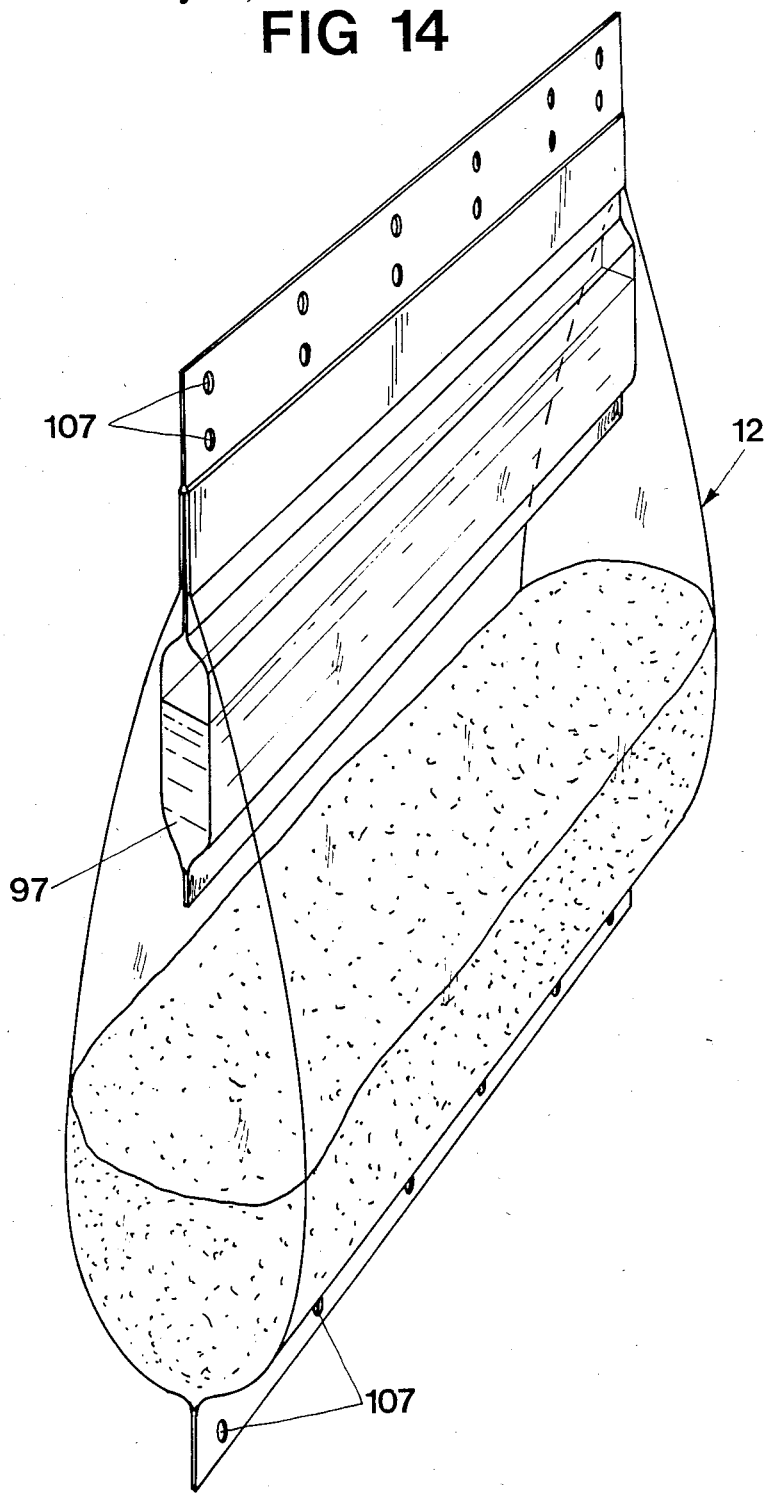
FIG. 14 is a perspective view of a bag used in the baking apparatus according to the invention.

In FIG. 14 is shown a perspective view of a bag 12 containing the dry ingredients for the dough and an inner bag 97 with the baking liquid. The sealed upper and lower edges of the bag 12 may be provided with perforations 107.

FIGS. 15-17

Figure 15:
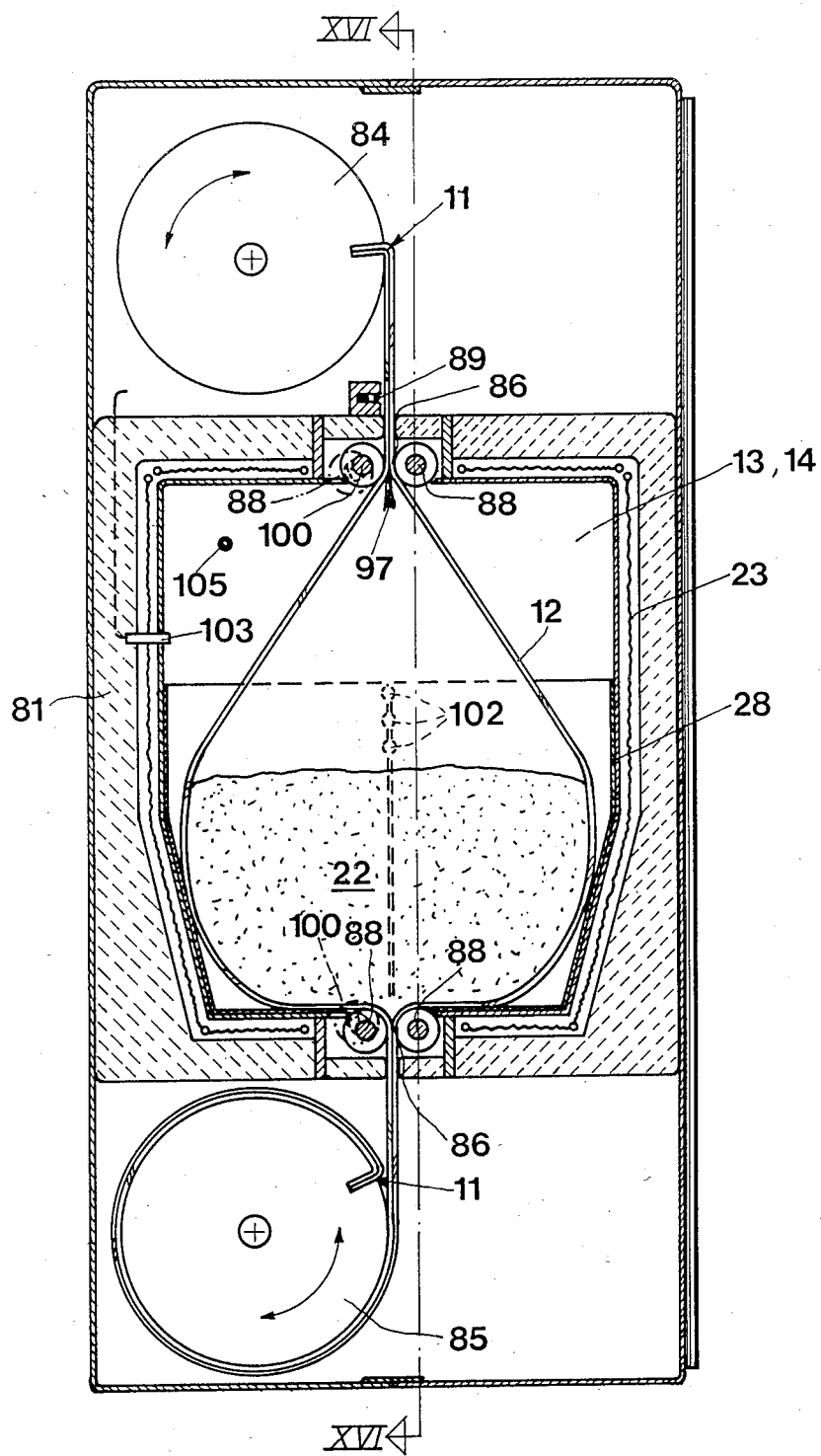
FIG. 15 show a section through an eighth embodiment of the baking apparatus modified with respect to FIG. 9.
Figure 16:
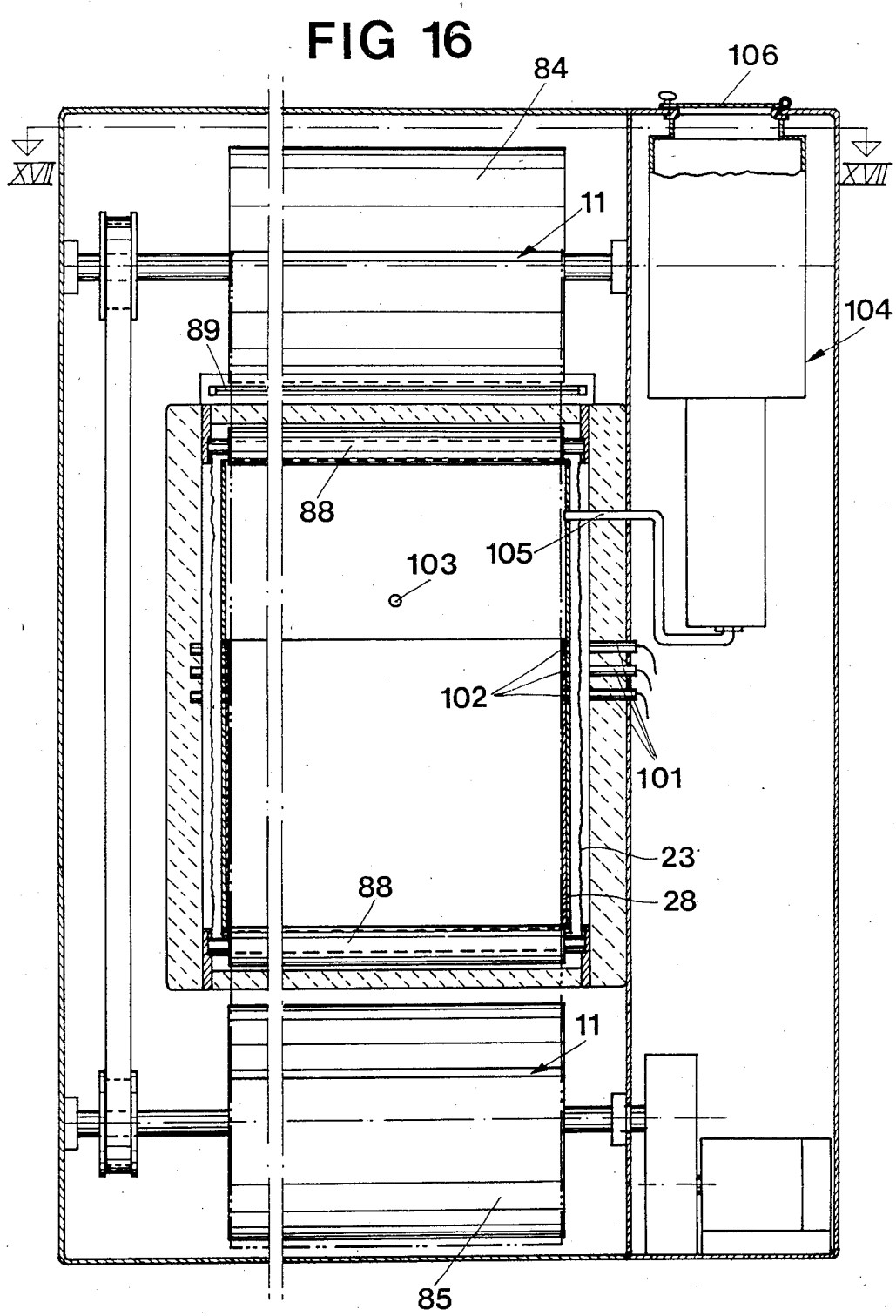
FIG. 16 is a section according to the line XVI—XVI in FIG. 15.

In the embodiment shown in FIGS. 15-17 a baking tin 28 is arranged in the common dough preparation and heat treatment station 13,14, which like the embodiment shown in FIG. 9 consist of two housing halves 81,82. The baking tin 28 also consist of two parts, e.g. hingedly connected to each other along the same parting line as the housing halves 81,82. The baking tin 28 can be removed from the housing 81,82 for washing purposes.

It can sometimes be necessary to ventilate the bag 12 during the mixing- and kneading operation due to formation of gas in the dough. One of the rolls 88 in each pair of rolls 88 between which the bag 12 passes is therefor displaceable in an inclined oblong groove 100, so that when the bag 12 is unrolled from the respective rotatable roll 84 or 85 the respective pair of rolls 88 is permitted to move apart a few millimeters, so that gas may escape. The opposite pair of rolls 88 are at the same time pressed together against the bag 12 and seal the opening thereof.

A similar function can be provided in other ways, e.g. by making one of the rolls 88 in each pair of rolls 88 spring-loaded and actuated by an electromagnet.

A cutting device 89 in the form of a heating filament is arranged to open the bag 12 after the mixing- and kneading operation is finished. The dough is then pressed out of the bag 12 and is spread in the baking tin 28 when the bag is reeled onto the rotatable roll 85 and removed from the dough preparation and heat treatment station 13,14 before the fermentation takes place.

A number of sensor, e.g. photocells 101, are arranged to detect the rise level of the dough in order to determine when the fermentation is sufficient. Apertures 102 are provided in the walls of the dough preparation— —and heat treatment station 13,14 and in the baking tin 28 just opposite the photocells 101.

A temperature sensor 103 for sensing the temperature in the dough preparation and heat treatment station 13,14 is also provided A steam generator 104 is connected to the dough preparation and heat treatment station 13,14 and is arranged to introduce steam into said station through a nozzle 105 during and/or after the baking operation in order to produce a crust and/or glossy surface on the bread. The steam generator 104 can be filled with water through an opening in the baking apparatus covered by a lid 106.

The invention is not limited to the embodiments described and shown but a plurality of modifications and combinations of details from the different embodiments are possible within the scope of the claims.

I claim:

1. Apparatus for automatically making food products in piece form from dough-like substances comprising: a housing containing holding means adapted to be affixed to either end of a flexible sealable bag containing the ingredients for the dough-like substance and a dough preparation station having a slit at the top and bottom portions thereof forming upper and lower slit openings respectively; kneading means for mechanically working the ingredients in said bag, said kneading means including the holding means and slit openings at each end of said bag, the bag adapted to be attached to the holding means and pass through the slit openings, and means for creating relative oscillating movement between the bag and the slit openings so that the ingredients are kneaded into a dough-like substance; and a heat treating station in said housing whereby the kneaded dough-like substance is treated; said slit openings each defined by two rollers, at least one of the rollers of at least the upper slit opening being moveable relative to the other roller in that pair so as to allow gas to escape from the bag at the desired time.

2. The apparatus as claimed in claim 1 wherein said housing, dough preparation station, and heat treating stations are divided into halves, one of the halves being openable so the interior is assessible, the junction of the halves in closed position along with said rollers defining said slit openings; and a baking container within the interior of said heat treating stations, which baking container is also divided into halves along the same partition line as said housing, dough preparation station, and heat treating station halves.

3. The apparatus as claimed as in claim 1 wherein a cutting means is provided between said upper slit and its respective holding means so that at a predetermined time said bag is cut, removed from said heat treating station by the other holding means through said lower slit, and the kneaded dough-like substance remains in said heat treating station.

4. The apparatus as claimed in claim 1 wherein sensor means are positioned in a wall of said heat treating station, which sensor means detect the rise level of said kneaded dough-like substance as it is treated.

5. The apparatus as claimed in claim 4 wherein said sensor means is a plurality of photocells vertically arranged so as to sense the height of said kneaded dough-like substance.

6. The apparatus as claimed in claim 1 wherein temperature sensing means are positioned in a wall of said heat treating station, which temperature sensing means detects the temperature of said kneaded dough-like substance as it is treated.

7. The apparatus as claimed in claim 1 wherein a steam generator is provided along with conduit means so as to introduce steam into said heat treatment station during the treatment of said kneaded dough-like substances.

8. The apparatus as claimed in claim 1 wherein said dough preparation station and said heat treatment stations are the same area in said housing; said holding means are rollers, each with attachment means for affixing said bag thereto, one roller being positioned above and one below said dough preparation and heat treatment station, said bag passing from the upper roller through said upper slit into said dough preparations and heat treatment station then through said lower slit to the lower roller; said upper and lower rollers being rotatable in unison and the rotation being reversed in alternating fashion so said bag is oscillated up and down through said pairs of rollers defining said slit openings so as to knead the ingredients in said bag.

* * * * *